(12) United States Patent
Nakamura et al.

(10) Patent No.: US 6,314,090 B1
(45) Date of Patent: Nov. 6, 2001

(54) METHOD OF PERCH CHANNEL TRANSMISSION AND CELL SELECTION IN CDMA MOBILE COMMUNICATION SYSTEM

(75) Inventors: Takehiro Nakamura, Yokosuka; Seizo Onoe; Kouji Ohno, both of Yokohama, all of (JP)

(73) Assignee: NTT Mobile Communications Network Inc., Tokyo (JP)

( * ) Notice: Subject to any disclaimer, the term of this patent is extended or adjusted under 35 U.S.C. 154(b) by 0 days.

(21) Appl. No.: 08/869,255

(22) Filed: Jun. 4, 1997

(30) Foreign Application Priority Data

Jun. 7, 1996 (JP) .................................................. 8-145895

(51) Int. Cl.[7] .......................... H04L 12/28; H04L 12/56; H04Q 7/20; H04B 7/00
(52) U.S. Cl. ........................... 370/335; 370/389; 370/395; 370/398; 370/415; 455/436; 455/443; 455/517
(58) Field of Search ............................. 455/63, 525, 515, 455/434, 437, 45.5, 516, 62, 38.3, 343; 370/389, 390, 392, 395, 398, 412, 415

(56) References Cited

U.S. PATENT DOCUMENTS

| | | |
|---|---|---|
| 5,404,573 | 4/1995 | Yabe et al. . |
| 5,420,850 * | 5/1995 | Umeda et al. ........................ 370/18 |
| 5,487,174 | 1/1996 | Persson . |
| 5,673,260 * | 9/1997 | Umeda et al. ...................... 370/342 |
| 5,680,395 * | 10/1997 | Weaver, Jr. et al. ................ 370/331 |
| 5,832,368 * | 11/1998 | Nakano et al. ........................ 455/63 |
| 5,873,047 * | 2/1999 | Nakano et al. ..................... 455/561 |
| 6,085,087 * | 7/2000 | Hori et al. ........................... 455/434 |

* cited by examiner

Primary Examiner—Wellington Chin
Assistant Examiner—M. Phan
(74) Attorney, Agent, or Firm—Oblon, Spivak, McClelland, Maier & Neustadt, P.C.

(57) ABSTRACT

A perch channel transmission and cell selection method for a CDMA mobile communication system which is capable increasing a system capacity by reducing an amount of interference power. In this method, each base station intermittently transmits a perch channel which is spread by using a spread code assigned to each base station. Then, a mobile station receives more than one perch channels transmitted from more than one base stations, measures a receiving level of an intermittently transmitted portion of each received perch channel, and judges a located cell according to measured receiving levels of these more than one perch channels.

11 Claims, 4 Drawing Sheets

METHOD OF PERCH CHANNEL TRANSMISSION AND CELL SELECTION IN CDMA MOBILE COMMUNICATION SYSTEM

BACKGROUND OF THE INVENTION

1. Field of the Invention

The present invention relates to a method of perch channel transmission and cell selection in a CDMA (Code Division Multiple Access) mobile communication system in which a plurality of base stations provided in respective cells transmit perch channels which are spread by using mutually different spread codes assigned to these base stations and each mobile station judges a located cell by receiving the perch channels.

2. Description of the Background Art

As an example of the conventional mobile communication system, there is a digital mobile communication system called PDC (Personal Digital Cellular) system which is currently providing a mobile communication service in Japan, in which the mobile station carries out the cell selection by receiving a perch channel that is transmitted from each base station continuously at a constant level. Then, the mobile station measures receiving levels of a plurality of perch channels that are constantly transmitted from a plurality of base stations in the surrounding, and judges that it is currently located in a cell from which the perch channel with the largest receiving level is transmitted.

On the other hand, in the CDMA mobile communication system, the system capacity is determined by an amount of interference power, and the system capacity is reduced when an amount of interference power is increased. In order to prevent an increase of an amount of interference power, there is a need to make the transmission power of a various type of radio channel as small as possible within a range in which the required receiving quality can be satisfied at a receiving side. In this regard, because of its use for the purpose of the cell selection by the mobile station, there is a need for the perch channel to be transmitted at a relatively large transmission power compared with the other radio channels so that the perch channel can be received even by a mobile station which is located in a neighboring cell.

Now, when the perch channel is transmitted continuously in the CDMA mobile communication system similarly as in the conventional PDC system, the interference power will be increased because of the relatively large transmission power of the perch channel, so that there is a problem that the system capacity will be reduced.

SUMMARY OF THE INVENTION

It is therefore an object of the present invention to provide a method of perch channel transmission and cell selection in a CDMA mobile communication system which is capable increasing a system capacity by reducing an amount of interference power.

In the present invention, such a reduction of an amount of interference power is realized by transmitting the perch channel intermittently.

According to one aspect of the present invention there is provided a method of perch channel transmission and cell selection in a CDMA mobile communication system in which a plurality of base stations are provided in respective cells and mutually different spread codes are assigned to said plurality of base stations, the method comprising the steps of: intermittently transmitting from each base station a perch channel which is spread by using a spread code assigned to each base station; receiving more than one perch channels transmitted from more than one base stations at a mobile station, measuring a receiving level of an intermittently transmitted portion of each received perch channel, and judging a located cell according to measured receiving levels of said more than one perch channels.

According to another aspect of the present invention there is provided a method of perch channel transmission and cell selection in a CDMA mobile communication system in which a plurality of base stations are provided in respective cells and mutually different spread codes are assigned to said plurality of base stations, the method comprising the steps of: transmitting from each base station a perch channel which is spread by using a spread code assigned to each base station and containing: a first information which is required to be transmitted frequently from a viewpoint of the mobile station and which is transmitted intermittently and periodically on the perch channel; and a second information which is not required to be transmitted frequently from a viewpoint of the mobile station and which is transmitted at an arbitrary timing according to need or at a prescribed timing in a longer period than a transmission period of the first information on the perch channel; and receiving more than one perch channels transmitted from more than one base stations at a mobile station, measuring a receiving level of an intermittently transmitted portion for the first information in each received perch channel, and judging a located cell according to measured receiving levels of said more than one perch channels, while receiving the second information according to need.

Other features and advantages of the present invention will become apparent from the following description taken in conjunction with the accompanying drawings.

DETAILED DESCRIPTION OF THE PREFERRED EMBODIMENTS

Figure 1:
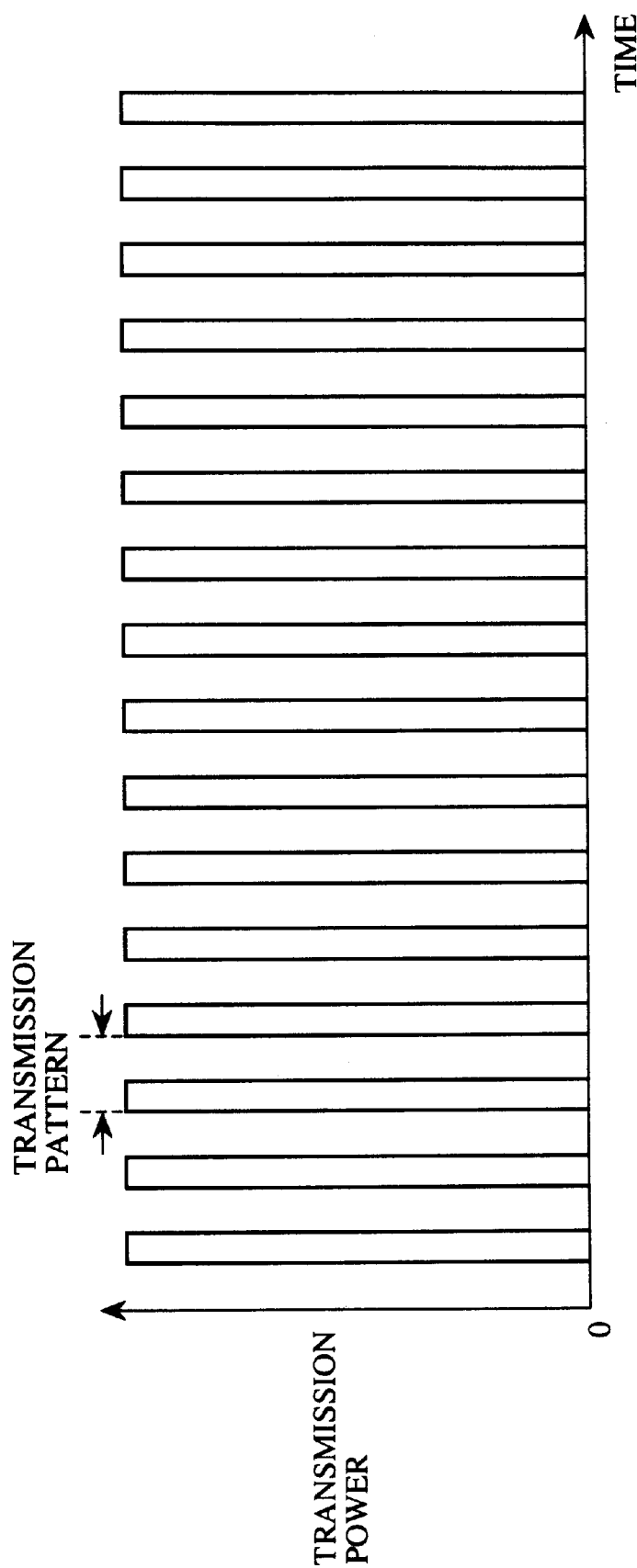
FIG. 1 is a diagram showing an exemplary perch channel transmission sequence in the first embodiment of a method of perch channel transmission and cell selection according to the present invention.
Figure 2:
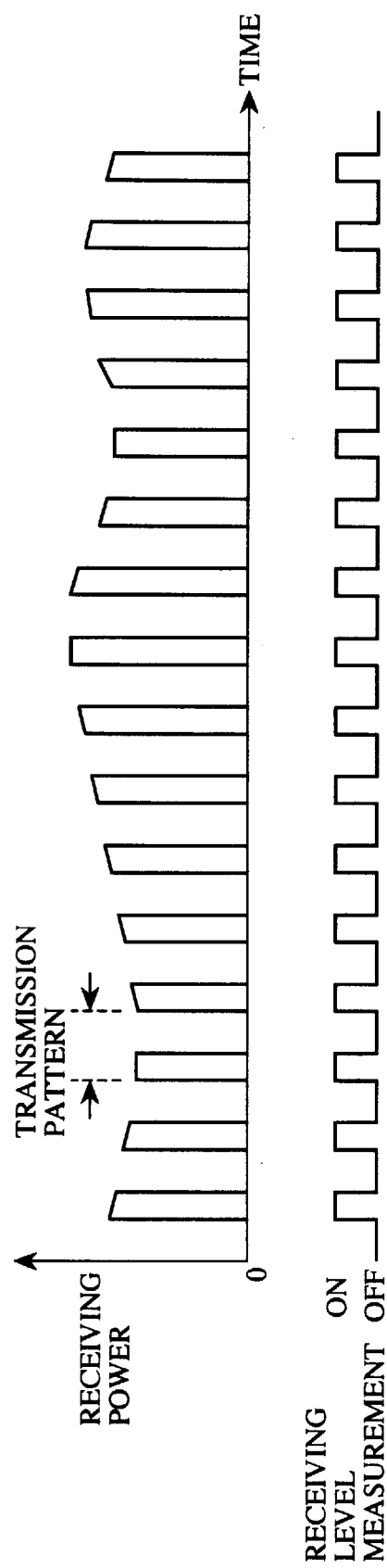
FIG. 2 is a diagram showing a receiving pattern and receiving level measurement timings at the mobile station in a case of receiving the perch channel transmitted by the transmission pattern of FIG. 1.

Referring now to FIG. 1 and FIG. 2, the first embodiment of a method of perch channel transmission and cell selection according to the present invention will be described in detail.

FIG. 1 shows an exemplary perch channel transmission sequence for repeating a particular transmission pattern in the first embodiment of a method of perch channel transmission and cell selection according to the present invention. By transmitting the perch channel intermittently from each base station as shown in FIG. 1, it is possible to reduce an amount of interference power compared with a case of transmitting the perch channel continuously.

Here, the interference power is temporarily increased while the perch channel is transmitted. However, by adopting the intermittent transmission for each of the other plurality of communication channels according to a control (VOX control) which stops the transmission whenever there is no speed data or transmission data temporarily, an amount of interference power can be reduced compared with a case of constantly transmitting all the radio channels because of the statistical multiplexing effect due to a mixed presence of radio channels which are transmitting and radio channels which are not transmitting among a plurality of radio channels including the perch channel at every moment.

FIG. 2 shows a receiving pattern and receiving level measurement timings at the mobile station in a case of receiving the perch channel transmitted by the transmission pattern of FIG. 1. As shown in FIG. 2, when the perch channel is transmitted intermittently by a particular transmission pattern at a constant transmission power, the receiving level is increased intermittently while being varied in time according to a movement of the mobile station or a change of a surrounding environment of the mobile station. The mobile station carries out the receiving level measurement at the transmission timings, takes an average of the receiving level measurement values over a prescribed period of time, and carries out the cell selection according to the obtained average receiving level value. More specifically, the above described receiving level measurement processing and the averaging processing are carried out for a plurality of perch channels, and a cell which is transmitting the perch channel with the largest average receiving level value is judged as a located cell.

Here, if the mobile station carries out the receiving level measurement continuously even at a timing at which the perch channel is not transmitted, the receiving level would be measured too low incorrectly so that the mobile station would not be able to carry out the cell selection correctly. For this reason, it is necessary for the mobile station to carry out the receiving level measurement only at timings at which the perch channel is transmitted. In this regard, in a case of transmitting the perch channel repeatedly by a particular transmission pattern such as that shown in FIG. 1, it suffices for the mobile station to memorize that particular transmission pattern in advance and carry out the receiving level measurement processing repeatedly at timings which coincide with the transmission timings of the memorized transmission pattern as indicated in FIG. 2, so that it is easily possible to realize the receiving level measurement at timings which coincide with the transmission timings.

Figure 3:
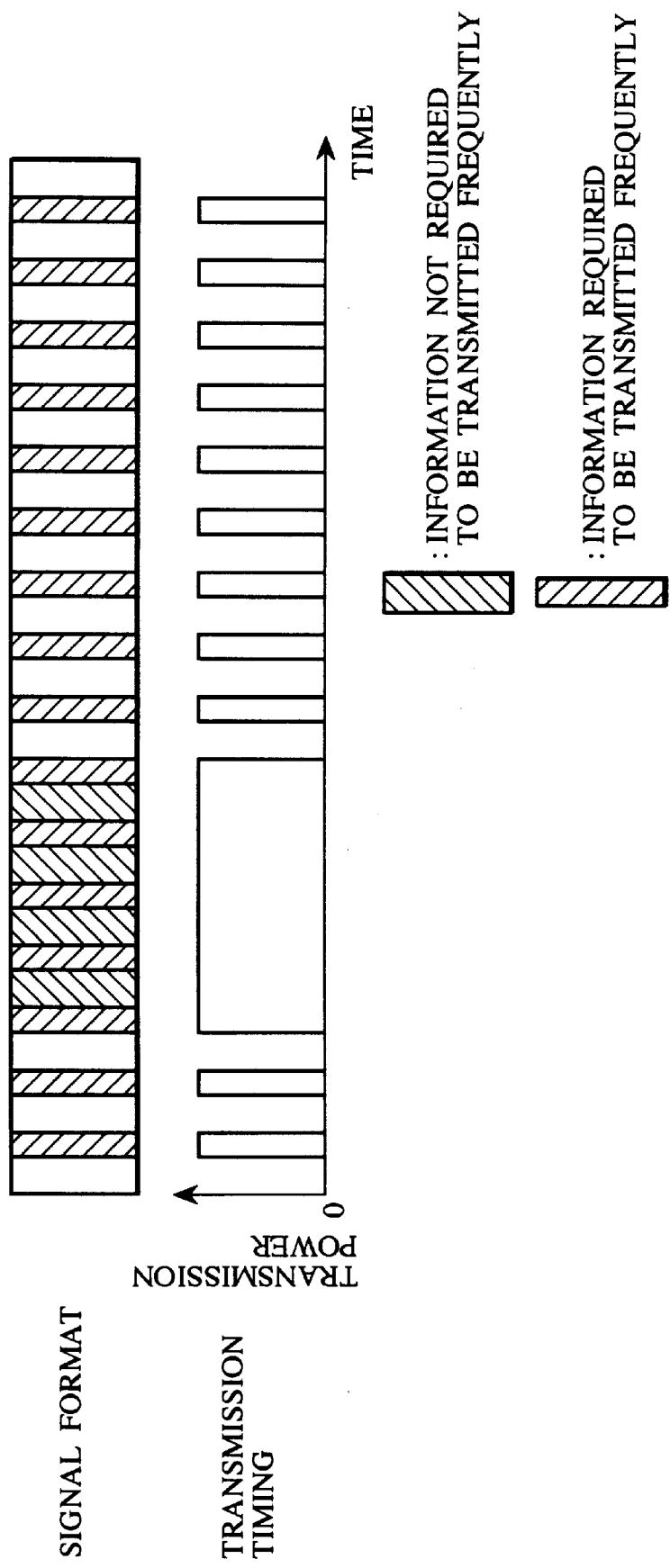
FIG. 3 is a diagram showing an exemplary perch channel signal format and transmission timings in the second embodiment of a method of perch channel transmission and cell selection according to the present invention.
Figure 4:
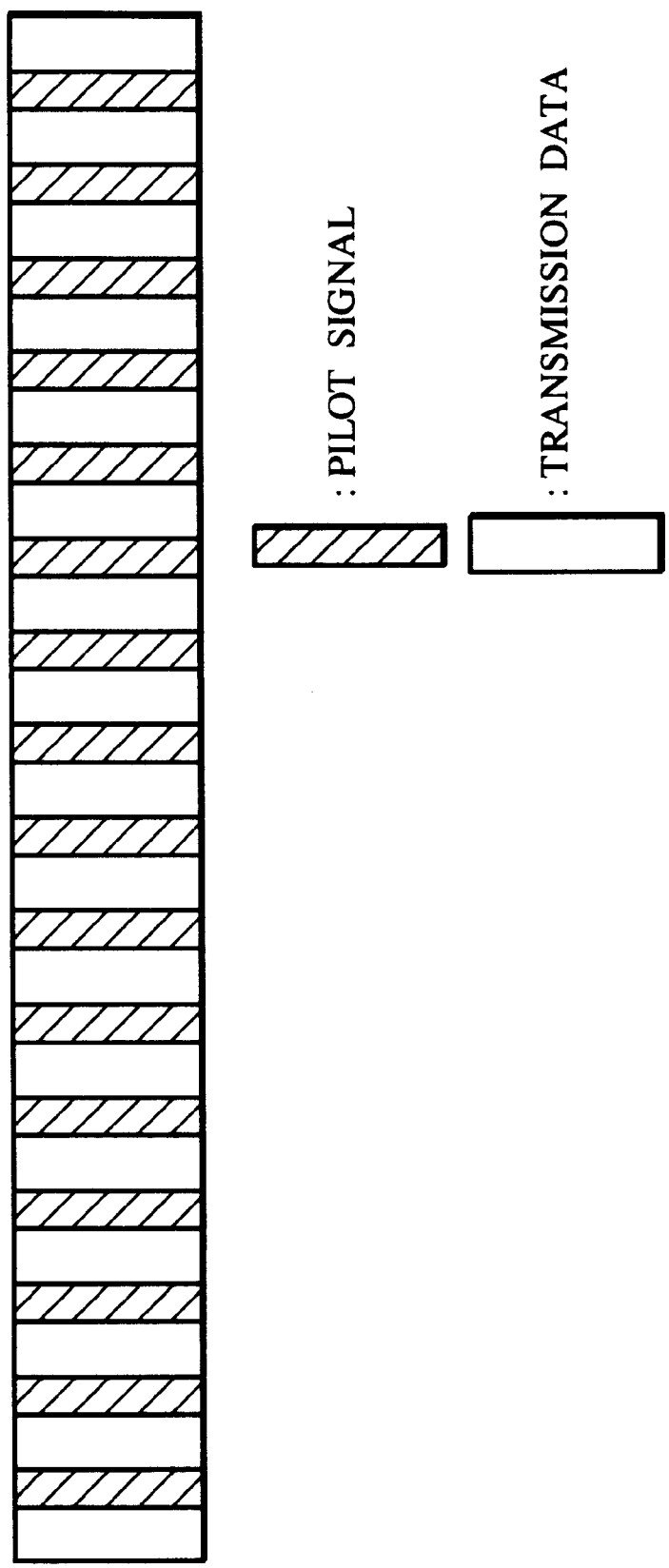
FIG. 4 is a diagram showing an exemplary signal format of a signal suitable for the coherent detection with interpolation in the second embodiment of a method of perch channel transmission and cell selection according to the present invention.

Referring now to FIG. 3 and FIG. 4, the second embodiment of a method of perch channel transmission and cell selection according to the present invention will be described in detail.

In this second embodiment, the perch channel transmission by the base station is realized such that only an information which is required to be transmitted frequently from a viewpoint of the mobile station is transmitted intermittently and periodically, while the other information which is not required to be transmitted frequently from a viewpoint of the mobile station is transmitted at an arbitrary timing according to the need or at a prescribed timing in a longer period than the transmission period of the information which is required to be transmitted frequently from a viewpoint of the mobile station.

FIG. 3 shows an exemplary perch channel signal format and transmission timings in the second embodiment of a method of perch channel transmission and cell selection according to the present invention. As shown in FIG. 3, the information which is required to be transmitted frequently is arranged intermittently and periodically in the perch channel signal format and transmitted at the intermittent and periodic timings. On the other hand, the information which is not required to be transmitted frequently is arranged at an arbitrary timing or a prescribed timing in a longer period within the signal format when the need arises and transmitted only at the arbitrary or prescribed timing without being transmitted at any other timings.

The mobile station measures the receiving level of the transmitted perch channel portion for the information which is required to be transmitted frequently from a viewpoint of the mobile station, and carries out the located cell judgement according to the measured receiving levels for a plurality of received perch channels. Here, the transmitted perch channel portion for the information which is required to be transmitted frequently is a portion which is always transmitted periodically so that the mobile station can carry out the receiving level measurement at the transmission timings accurately by memorizing the transmission timings in advance similarly as in the first embodiment described above.

On the other hand, the mobile station receives the information which is not required to be transmitted frequently from a viewpoint of the mobile station according to the need, at the arbitrary timing according to the need or at a prescribed timing in a longer period than the transmission period of the information which is required to be transmitted frequently from a viewpoint of the mobile station. In a case where the information which is not required to be transmitted frequently is transmitted at an arbitrary timing within the signal format, the base station attaches an error detection bit to this information while the mobile station carries out the error detection by constantly receiving the perch channel and acquires this information only when the error is not detected, so as to receive this information which is transmitted at an arbitrary timing. In a case where the information which is not required to be transmitted frequently is transmitted at a prescribed timing within the signal format, the mobile station can receive this information which is transmitted at a prescribed timing by memorizing the prescribed timing in advance.

According to this second embodiment, it is possible to reduce an amount of transmission signals compared with a case of separately transmitting the information which is required to be transmitted frequently from a viewpoint of the mobile station and the transmission information whose receiving level is to be measured by the mobile station for the purpose of the cell selection. Consequently, it is possible to suppress an increase of an amount of interference power due to the perch channel. The mobile station can receive the information which is required to be transmitted frequently, while carrying out the cell selection by measuring the receiving level of the transmitted perch channel portion for the information which is required to be transmitted frequently.

An example of the information which is required to be transmitted frequently from a viewpoint of the mobile station is a synchronization information which is necessary for the mobile station in establishing the synchronization for receiving the perch channel. Namely, in order for the mobile station to receive the information on the perch channel, there is a need for the mobile station to establish the synchronization with the perch channel signal format. To this end, the base station includes the synchronization information which is necessary for the mobile station in establishing the synchronization for receiving the perch channel, at a prescribed position within the perch channel signal format. This synchronization information can be realized in a form of a specific bit sequence. The mobile station memorizes this specific bit sequence and the prescribed position of this specific bit sequence on the signal format in advance. Then, the mobile station receives and demodulates the perch channel for a certain period of time, and checks whether the specific bit sequence exists or not. When the specific bit sequence exists, the synchronization with the perch channel signal format can be established according to the position of that specific bit sequence.

This synchronization information is required to be transmitted frequently in order for the mobile station to maintain the synchronization for receiving the perch channel. By including this synchronization information in the information which is transmitted intermittently and periodically for the purpose of the cell selection on the perch channel, it becomes possible for the mobile station to receive the synchronization information, while an amount of transmission signals can be reduced compared with a case of separately transmitting the synchronization information and the information for the purpose of the cell selection, so that an amount of interference power can be reduced and a decrease of the system capacity can be prevented.

Another example of the information which is required to be transmitted frequently from a viewpoint of the mobile station is a pilot signal which is necessary for the mobile station in receiving the perch channel by the coherent detection with interpolation. For detail of the pilot signal and the receiving by the coherent detection with interpolation, see PCT Application International Publication No. WO95/35615. This reference discloses a method for receiving by the coherent detection with interpolation in which the known pilot signal is inserted at a prescribed interval in the radio channel, while the receiving side estimates the propagation function of the radio section according to the received pilot signal and carries out the coherent detection with interpolation according to the estimated propagation function with respect to the transmission data which are sandwiched between two pilot signals.

FIG. 4 shows an exemplary signal format of a signal suitable for the coherent detection with interpolation. This pilot signal is required to be transmitted frequently in order to carry out the coherent detection with interpolation, so that the pilot signal is transmitted intermittently and periodically as shown in FIG. 4. By including this pilot signal in the information which is transmitted intermittently and periodically for the purpose of the cell selection on the perch channel, it becomes possible for the mobile station to receive the pilot signal and carry out the coherent detection with interpolation, while an amount of transmission signals can be reduced compared with a case of separately transmitting the pilot signal and the information for the purpose of the cell selection, so that an amount of interference power can be reduced and a decrease of the system capacity can be prevented.

Still another example of the information which is required to be transmitted frequently from a viewpoint of the mobile station is a spread code synchronization information which is necessary for the mobile station in establishing the synchronization for receiving the spread code having a long period. In the CDMA mobile communication system, in order to increase a number of radio channels that can be used simultaneously, there is a need to use many spread codes, and it is necessary to use the spread code having a long period (the long code) in order to secure many spread codes. On the other hand, the use of the long code has a drawback in that the synchronization for receiving the long code requires a long time.

In this regard, there is a method for establishing the synchronization for receiving the long code at high speed by notifying the spread code synchronization information for the long code, as disclosed in PCT Application International Publication No. WO95/22213. According to this method, the perch channel to be received by the mobile station immediately after the power is turned ON or at a time of the cell selection is spread by using the spread code having a short period (short code) so that the mobile station establishes the synchronization for receiving the perch channel in a short time, while the radio channels other than the perch channel are spread by using the long codes and the synchronization information for the long codes is notified by the perch channel so that the synchronization for receiving the long codes of the other radio channels can also be established at high speed.

This spread code synchronization information is required to be transmitted frequently in order to establish the synchronization for the long codes of the radio channels other than the perch channel. By including this spread code synchronization information in the information which is transmitted intermittently and periodically for the purpose of the cell selection on the perch channel, it becomes possible for the mobile station to receive the spread code synchronization information and establish the synchronization for receiving the long code at high speed, while an amount of transmission signals can be reduced compared with a case of separately transmitting the spread code synchronization information and the information for the purpose of the cell selection, so that an amount of interference power can be reduced and a decrease of the system capacity can be prevented.

Note that three examples of the information which is required to be transmitted frequently from a viewpoint of the mobile station are described above separately, but it is also possible to transmit more than one or all of them intermittently and periodically according to the present invention.

An example of the information which is not required to be transmitted frequently from a viewpoint of the mobile station is a system related information for the mobile station whose contents are less frequently changed compared with a frequency of measuring the perch channel receiving level at the mobile station for the purpose of the cell selection. The major contents of this system related information include the perch channel spread codes of the neighboring cells, the perch channel transmission power, the regulation information, and various operation commanding parameters. As this system related information is less frequently changed, once this system related information is received and memorized by the mobile station, there is no need to receive this system related information again for a substantial period of time thereafter. Consequently, it suffices to transmit this system related information at an arbitrary timing according to the need or at a prescribed timing in a longer period than the transmission period of the information which is required to be transmitted frequently from a viewpoint of the mobile station, and therefore it is possible to prevent an increase of an amount of interference power due to unnecessarily frequent transmission of the system related information.

As described, according to the present invention, by transmitting the perch channel intermittently, it is possible to prevent an increase of an amount of the interference power due to the perch channel transmission compared with a case of transmitting the perch channel continuously, and therefore it becomes possible to prevent a degradation of the system capacity. In addition, at the mobile station, by measuring the receiving level of only the intermittently transmitted portion of each received perch channel, and carrying out the cell selection by using the measured receiving levels for a plurality of received perch channels, it is possible to realize the cell selection similarly as in the conventional case.

Moreover, according to the present invention, by using the particular intermittent transmission pattern and memorizing this transmission pattern at the mobile station in advance, it is possible for the mobile station to measure the receiving level of the transmitted portion of each received perch channel easily even when the perch channel is transmitted intermittently.

Also, according to the present invention, by transmitting the information which is required to be transmitted frequently from a viewpoint of the mobile station intermittently and periodically, it is possible to prevent an increase of an amount of the interference power due to the perch channel transmission, and the mobile station can receive the information which is required to be transmitted frequently while carrying out the cell selection by measuring the receiving level of the transmitted portion for the information which is required to be transmitted frequently. In addition, by transmitting the information which is not required to be transmitted frequently from a viewpoint of the mobile station at an arbitrary timing according to the need or at a prescribed timing in a longer period than the transmission period of the information which is required to be transmitted frequently from a viewpoint of the mobile station, it is possible to prevent an increase of an amount of interference power due to unnecessarily frequent transmission.

Moreover, according to the present invention, the information which is required to be transmitted frequently from a viewpoint of the mobile station includes the synchronization information which is necessary for the mobile station in establishing the synchronization for receiving the perch channel, the pilot signal which is necessary for the mobile station in receiving the perch channel by the coherent detection with interpolation, and/or the spread code synchronization information which is necessary for the mobile station in establishing the synchronization for receiving the spread code having a long period, and by transmitting such an information intermittently and periodically, it is possible for the mobile station to realize the synchronization for receiving the perch channel, the coherent detection with interpolation, and/or the spread code synchronization, while it is also possible to prevent an increase of an amount of interference power due to the perch channel transmission.

Furthermore, according to the present invention, the information which is not required to be transmitted frequently from a viewpoint of the mobile station includes the system related information which is not changed frequently, and by transmitting such an information at an arbitrary timing according to the need or at a prescribed timing in a longer period than the transmission period of the information which is required to be transmitted frequently from a viewpoint of the mobile station, it is possible to prevent an increase of an amount of interference power due to unnecessarily frequent transmission.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of perch channel transmission and cell selection in a CDMA mobile communication system in which a plurality of base stations are provided in respective cells and mutually different spread codes are assigned to said plurality of base stations, the method comprising the steps of:

intermittently transmitting from each and every one of said plurality of base station a perch channel which is spread by using a spread code assigned to each base station so as to reduce an amount of interference power in CDMA mobile communication system compared with a case of transmitting the perch channel continuously, the perch channel containing:

a first information which is required to be transmitted frequently from a viewpoint of the mobile station and which is transmitted at intermittent and periodic timing on the perch channels; and a second information which is not required to be transmitted frequently from a viewpoint of the mobile station and which is transmitted at an arbitrary timing according to need or at a prescribed timing in a longer period than a transmission period of the first information on the perch channel, the arbitrary timing or the prescribed timing being provided between successive ones of the intermittent and periodic timings at which the first information is transmitted; and receiving more than one perch channel transmitted from more than one base station at a mobile station, measuring a receiving level of only an intermittently transmitted portion for the first information in each received perch channel while receiving the second information according to need, and judging a located cell according to measured receiving levels of said more than one perch channel.

2. The method of claim 1, wherein each base station transmits the perch channel intermittently by repeating a particular intermittent transmission pattern, and the mobile station memorizes the particular intermittent transmission pattern in advance and measures the receiving level at the intermittently transmitted portion of the particular intermittent transmission pattern as memorized in advance.

3. The method of claim 1, wherein the first information includes a synchronization information which is necessary for the mobile station in establishing a synchronization for receiving the perch channel.

4. The method of claim 1, wherein the first information includes a pilot signal which is necessary for the mobile station in receiving the perch channel by a coherent detection with interpolation.

5. The method of claim 1, wherein the first information includes a spread code synchronization information which is necessary for the mobile station in establishing a synchronization for receiving a spread code having a long period.

6. The method of claim 1, wherein the second information includes a system related information for the mobile station whose contents are less frequently changed compared with a frequency of measuring the receiving level at the mobile station.

7. A method of perch channel transmission and cell selection in a CDMA mobile communication system in which a plurality of base stations are provided in respective cells and mutually different spread codes are assigned to said plurality of base stations, the method of the steps of:

transmitting from each base station a perch channel which is spread by using a spread code assigned to each base station and containing:

a first information which is required to be transmitted frequently from a viewpoint of the mobile station and which is transmitted at intermittent and periodic timings on the perch channel; and a second information which is not required to be transmitted frequently from a viewpoint of the mobile station and which is transmitted at an arbitrary timing according to need or at a prescribed timing in a longer period than a transmission period of the first information on the perch channel, the arbitrary timing or the prescribed timing being provided between successive ones of the intermittent and periodic timings at which the first information is transmitted; and receiving more than one perch channel transmitted from more than one base station at a mobile station, measuring a receiving level of an intermittently transmitted portion for the first information in each received perch channel, and judging a located cell according to measured receiving levels of said more than one perch channel, while receiving the second information according to need.

8. The method of claim 7, wherein the first information includes a synchronization information which is necessary for the mobile station in establishing a synchronization for receiving the perch channel.

9. The method of claim 7, wherein the first information includes a pilot signal which is necessary for the mobile station in receiving the perch channel by a coherent detection with interpolation.

10. The method of claim 7, wherein the first information includes a spread code synchronization information which is necessary for the mobile station in establishing a synchronization for receiving a spread code having a long period.

11. The method of claim 7, wherein the second information includes a system related information for the mobile station whose contents are less frequently changed compared with a frequency of measuring the receiving level at the mobile station.

* * * * *

UNITED STATES PATENT AND TRADEMARK OFFICE
CERTIFICATE OF CORRECTION

PATENT NO. : 6,314,090 B1
DATED : November 6, 2001
INVENTOR(S) : Nakamura et al.

Page 1 of 1

It is certified that error appears in the above-identified patent and that said Letters Patent is hereby corrected as shown below:

<u>Title page,</u>
Item [45], and the Notice information should read:

-- [45] Date of Patent: *Nov. 6, 2001 --

-- [*] Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days --

Signed and Sealed this

Twenty-third Day of April, 2002

Attest:

*Attesting Officer*

JAMES E. ROGAN
*Director of the United States Patent and Trademark Office*